US011501022B2

(12) United States Patent
Hulick, Jr.

(10) Patent No.: US 11,501,022 B2
(45) Date of Patent: *Nov. 15, 2022

(54) APPLICATION SECURITY POLICY MANAGEMENT AGENT

(71) Applicant: Cisco Technology, Inc., San Jose, CA (US)

(72) Inventor: Walter T. Hulick, Jr., Pearland, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/076,465

(22) Filed: Oct. 21, 2020

(65) Prior Publication Data

US 2021/0034772 A1 Feb. 4, 2021

Related U.S. Application Data

(63) Continuation of application No. 16/037,141, filed on Jul. 17, 2018, now Pat. No. 10,853,521.

(51) Int. Cl.
*G06F 21/00* (2013.01)
*G06F 21/62* (2013.01)
(Continued)

(52) U.S. Cl.
CPC ........ *G06F 21/629* (2013.01); *G06F 11/3065* (2013.01); *G06F 21/53* (2013.01); *H04L 63/20* (2013.01)

(58) Field of Classification Search
None
See application file for complete search history.

(56) References Cited

U.S. PATENT DOCUMENTS 7,308,702 B1 * 12/2007 Thomsen ................ H04L 63/06
707/999.009
7,712,126 B2 ‡ 5/2010 Andersson ............. G06F 21/53
726/1

(Continued)

OTHER PUBLICATIONS

Michener, John R. Common Permissions in Microsoft Windows Server 2008 and Windows Vista. IEEE Security & Privacy, vol. 6, Issue: 3. https://ieeexplore.ieee.org/stamp/stamp.jsp?tp=&arnumber=4530403 (Year: 2008).*

(Continued)

*Primary Examiner* — Jeremiah Lavery
(74) *Attorney, Agent, or Firm* — Edell, Shapiro & Finnan, LLC (57) ABSTRACT

A policy generation agent automatically generates a security policy for an application and a security manager. The agent runs the application in a development environment, causing the application to request permissions from the security manager. The agent passes the permissions request to the security manager. The security manger determines whether to approve or deny the request based on a permissions policy. Responsive to a determination to deny the request, the agent generates an updated permissions policy by updating the permissions policy to approve subsequent requests for the permissions. The agent also associates the updated permissions policy with the application, and suppresses any exceptions generated by the security manager in denying the request before approving the request for the permissions in the development environment.

20 Claims, 5 Drawing Sheets

(51) Int. Cl.
  *G06F 21/53* (2013.01)
  *H04L 9/40* (2022.01)
  *G06F 11/30* (2006.01)

(56) References Cited

U.S. PATENT DOCUMENTS

| | | | | |
|---|---|---|---|---|
| 8,024,564 B2 ‡ | 9/2011 | Bassani | ................ | G06F 21/604 |
| | | | | 713/16 |
| 9,313,230 B1 * | 4/2016 | Kruse | ..................... | H04L 63/20 |
| 9,712,542 B1 * | 7/2017 | Brandwine | ............. | H04L 67/10 |
| 9,871,800 B2 ‡ | 1/2018 | Subramanian | ........ | H04L 63/102 |
| 2005/0055578 A1 * | 3/2005 | Wright | .................... | G06F 21/32 |
| | | | | 726/4 |
| 2006/0288401 A1 ‡ | 12/2006 | Wilson | ................... | G06F 21/53 |
| | | | | 726/1 |
| 2009/0077621 A1 * | 3/2009 | Lang | ....................... | H04L 63/10 |
| | | | | 726/1 |
| 2009/0099860 A1 * | 4/2009 | Karabulut | ............ | G06F 21/604 |
| | | | | 705/325 |

OTHER PUBLICATIONS

Jiang, Danyang et al. A security assessment method for Android applications based on permission model. 2012 IEEE 2nd International Conference on Cloud Computing and Intelligence Systems, https://ieeexplore.ieee.org/stamp/stamp.jsp?tp=&arnumber=6664265 (Year: 2012).*

Gianluca Tonti, et al., "Automated Generation of Enforcement Mechanisms for Semantically-rich Security Policies in Java-based Multi-Agent Systems", IEEE First Symposium on Multi-Agent Security and Survivability, 2004, Aug. 31, 2004, Drexel, PA, 10 pages.‡

Maria Leitner et al., "AW-RBAC: Access Control in Adaptive Workflow Systems", 2011 Sixth International Conference an Availability, Reliability and Security, IEEE, Aug. 2011, 8 pages.

Hamid Bagheri et al., "COVERT: Compositional Analysis of Android Inter-App Permission Leakage", IEEE Transactions on Software Engineering, vol. 41, No. 9, Sep. 2015, 21 pages.

Mark S. Petrovic, "ProfilingSecurityManager", Apache River v3.0.0 API Documentation, retrieved from Internet Oct. 21, 2020, 3 pages.

\* cited by examiner
‡ imported from a related application

APPLICATION SECURITY POLICY MANAGEMENT AGENT

CROSS-REFERENCE TO RELATED APPLICATIONS

This application is a continuation of U.S. patent application Ser. No. 16/037,141, filed Jul. 17, 2018, the entire contents of which are incorporated herein by reference.

TECHNICAL FIELD

The present disclosure relates to automatically creating and managing security policies for applications.

BACKGROUND

One method of implementing security in software development is through permissions and policies that allow or deny permissions to certain software code. As projects increase in size and complexity, source code for an application may be derived from multitudes of different sources, with each module of source code using different permissions. Creating a policy that covers all possible permissions from all of the source code modules is time consuming, tedious, and error prone. With a single error in the security policy able to disable an entire application, many application stakeholders choose to simply run with security, or use the default security of the computing environment.

DESCRIPTION OF EXAMPLE EMBODIMENTS

Overview

The techniques presented herein provide for a method for a policy generation agent to automatically generate a security policy for an application and a specified custom security manager function. The method includes launching on a computing device an application in a development environment. The application defines a custom security manager function. The method also includes instantiating a development security manager function based on the custom security manager function. The agent runs the application in the development/staging environment, which causes the application to request one or more permissions from the development security manager function. The method further comprises passing the request for the permissions to the custom security manager function and approving the one or more permissions by the development security manager function. The custom security manger function determines whether to approve or deny the request based on a permissions policy. Responsive to a determination to deny the request, the method comprises updating the permissions policy to approve subsequent requests for the one or more permissions. The method also includes associating the updated permissions policy with the application name and version.

Detailed Description

The techniques described herein provide for auditing all permission requests (e.g., number of times requested, requesting locations, etc.), as well as what the outcome would have been (i.e., denied or allowed) for various code modules using the Java® 2 Enterprise Edition (J2EE) security model. Though the techniques will be described with respect to the J2EE software environment, other software languages and security models may be used and the embodiments presented herein are not limited to any particular software models of platform. The audit report generated by the techniques described herein may be used to build a full security policy for the application. This may be used to automate a typically tedious and time consuming process to build an application security policy.

In general, the main functions of the Application Security Management Agent are testing a specified J2EE security manager and policy by auditing permission calls from the runtime (pinpointing the initiating code), detecting calls that would have failed and identifying the reason, and automatically building (and updating the runtime) on the fly a security policy that would prevent any failures. A basic summary of the Java security can be summed up as:

- A security manager is specified via the switch -Djava.lang.SecurityManager[=classname] in the Java Virtual Machine (JVM) startup arguments. If no class is specified, then the default JVM security manager (java.lang.SecurityManager) is used. If the switch is not set, then the JVM will not use Java security;
- A policy file is set via the switch -Djava.security.policy=file in the JVM startup arguments. If a file is not specified, then the default JVM security policy ($JAVA_HOME/lib/security/java.policy) is used;
- When the Java runtime executes, different Application Programming Interfaces (APIs), such as File read/write, property read/write, etc., check to see if a security manager is active (System.getSecurityManager( ));
- If a security manager is active, then the security manager is called to check permissions called by the application;
- The security manager either returns normally (i.e., grants the permission) or throws a security exception (i.e., denies the permission).

This is a basic description of the steps taken in the computing environment (e.g., the JVM) to ensure security, and these steps are typically completely transparent to the application running in the computing environment. Although current solutions exist for creating a custom security manager or customizing the standard Java security manager, most implementations simply delegate the decision making to the default security manager, which delegates to the core decision making class (i.e., the access controller java.lang.AccessController).

The access controller may determine whether or not a "privileged call" was made and simply check the last caller on the stack "Protection Domain" against the policy file. Alternatively, the access controller may create the access control context by looking at the entire call stack and building a list of "Protected Domains" (i.e., code sources) that are to be checked. In this case, a check against the policy file is made of either the last caller on the stack or the entire stack, and if the call(s) are found not to have the proper privileges specified in the policy file, then an access violation is thrown.

Overall, the policy file defines the privileges to grant or deny permissions. Typically, there is one master policy file, which may contain links to other policy files. In general, the policy file includes a series of grants in which the code sources (Protection Domains, e.g., jars) are granted permissions. Alternatively, the policy file may include a series of restrictions in which the code sources are denied permissions.

One issue with implementing security in a J2EE application lies in generating a policy file for the application. For this reason, many applications do not run with the Java Security Manager enabled. Failure to construct a valid policy file can cause the application to deny service or crash entirely. In order to construct a policy file, the developer needs to know which privileges are being requested by which code sources under normal circumstances, and translate that knowledge into a policy file. Since many applications have hundreds of code sources, including third party code modules, each potentially requesting numerous Java permissions, manually generating the policy file is an almost impossible task for either the application developer or the end user. The techniques presented herein allow the runtime application to function and automatically "learns" which permissions are needed by which code sources, without impacting the runtime behavior.

Figure 1:
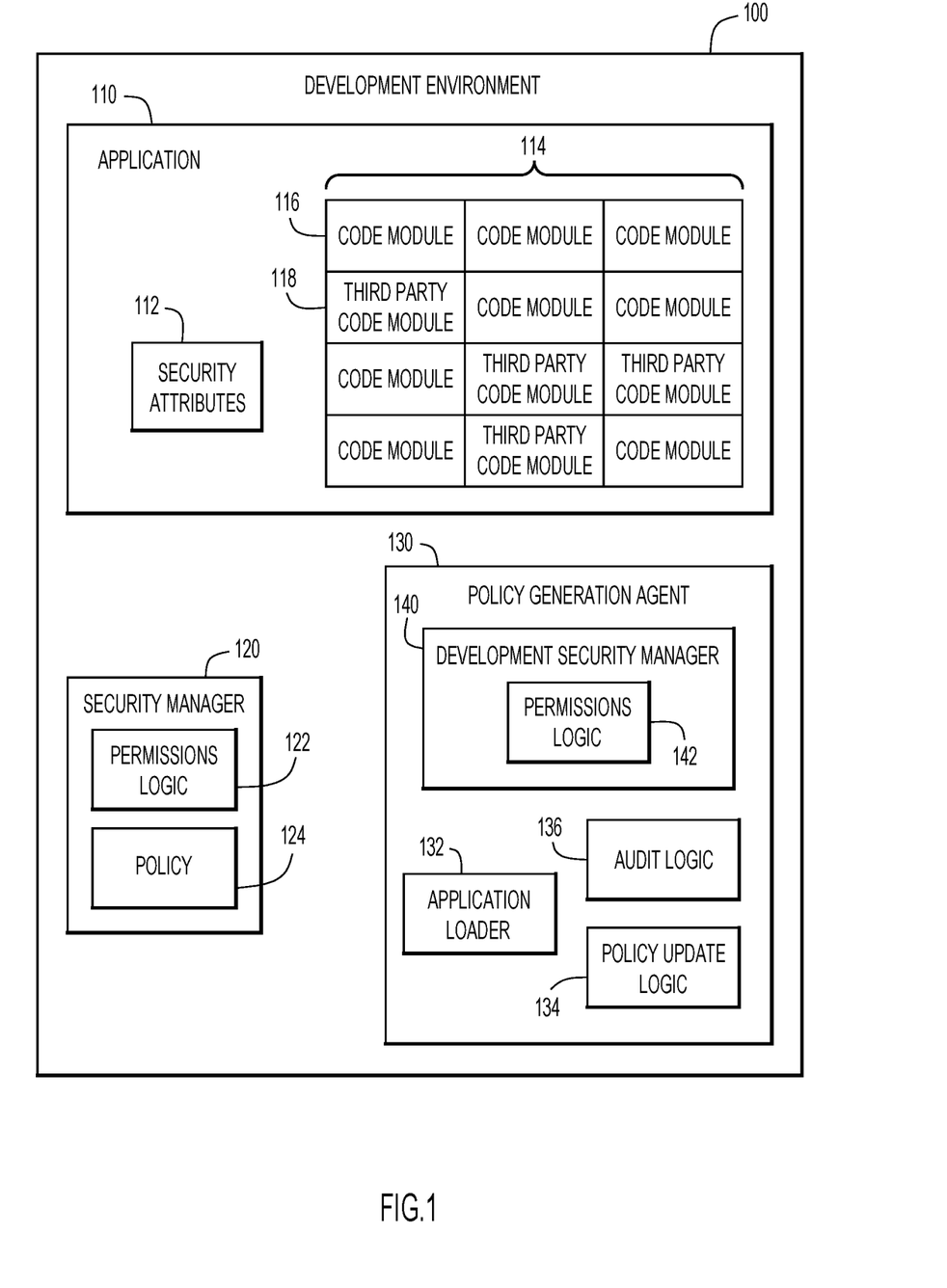
FIG. 1 is a block diagram of a development environment configured to track permission requests and automatically generate a security policy, according to an example embodiment.

Referring now to FIG. 1, a block diagram is shown of a development environment 100 configured to automatically track and audit permission requests from an application 110. The development environment may be a physical computing device, and is typically a separate environment from the deployment environment in which the application 110 will run for a customer. The application 110 includes a definition of security attributes 112, such as a security manager or security policy. The application also includes a source code 114 comprising a plurality of code modules (e.g., code module 116). Some of the code modules in the source code 114 may be third party code modules (e.g., third party code module 118), which were written by a different author than the author of the application 110. For instance, a third party code module may include a standard library or other previously written function.

Within the development environment 100, a security manager 120 controls the permissions of what the application 110 is allowed to access. The security manager 120 includes permissions logic 122 that determines whether to allow or deny any particular request for permission based on a policy 124.

The development environment 100 uses a policy generation agent 130 to automatically track permission requests from the application 110 and generate and/or update the policy 124 for the application 110. The policy generation agent 130 includes an application loader 132 that runs the application 110 with many different parameters to ensure that as much of the source code 114 as possible is called during the running of the application 110. The policy generation agent 130 also includes policy update logic 134 configured to update the policy 124 for the application 110 based on the permissions requested while the application loader 132 runs the application 110. An audit logic 134 of the policy generation agent 130 is configured to track all of the permissions requested while the application loader 132 runs the application 110, and generate an audit log of the requests. For instance, the audit logic 136 may report how many permission requests were made, what type of permission requests were made, how much processor time was spent making requests, and which code modules made each permission request. The policy generation agent 130 also includes a development security manager 140 with permissions logic 142 to allow the application loader 132 to continue running the application 110 without encountering any exceptions due to denied permission requests.

In one example, the development environment 100 is a Java Virtual Machine that is configured to run a Java application 110. The policy generation agent 130 uses the application loader 132 (e.g., LoadRunner) to load and "exercise" the application 110. The agent 130 checks to see if a security manager 120 is defined in the security attributes 112, and saves the defined security manager 120. The security attributes 112 may define a custom security manager 120, e.g., with specific permissions logic 122 that are predetermined for the eventual deployment environment. Alternatively, the security attributes may not specify any security manager, and the policy generation agent uses the default Java security manager for the security manager 120.

The agent 130 instantiates the development security manager 140, which receives the permission requests from the runtime. As it receives each permission request, the agent 130 also sends the request to the security manager 120 (e.g., a custom security manager defined by the application). If the permission is denied by the permissions logic 122, then a security exception is thrown. However, the security exception is caught by the development security manager 140 and stopped from being passed on to the application 110 and disrupting the flow of the application 110.

The security exception is parsed to determine the reason (e.g., code module in the stack as a jar) that the permission request was denied. This information is used to update a "cached" policy, which is being built on the fly, e.g., by adding a "grant" with the "jar" and permission to the cached policy. At periodic intervals, the agent 130 may write the cached policy to the disk, updating the policy 124 and reload the updated policy 124 into the runtime to be tested. Over time (e.g., minutes) the number of updates would decrease as the new policy 124 begins to affect the decisions of the security manager 120. At some point, the agent 130 running the application 110 stops having any updates to the policy, as the policy has captured all of the permission requests from the application 110. The last written policy 124 may then be deployed as the real policy associated with the application 110.

In another example, this is a learning system for a Java security manager to build a policy to the exact specifications of the targeted application. Typically, building a policy file is done by hand, which is tedious, error prone, and must be changed with each change to the application code. The policy generation agent describe herein may also be applied continuously. The agent has the ability to update the runtime policy, which normally would require a restart, using reflection and looking at the Java runtime code. Further, the agent can learn using any security manager and/or starting policy. Specifically, the policy generation agent described herein allows for a custom security manager instead of the Java standard default security manager. The custom security manager may be built using other security products that have learned behavior.

The policy generation agent learns from real requests to the security manager, but suppresses the result so that the application is not affected by any adverse policy decisions. The agent uses the security manager that will be used in production. The agent uses the specific application version that will be used in production. The development environment of the agent may act as part of a development pipeline (e.g., an automated part of DevOps/SecOps).

In a further example, the learning of the policy generation agent may be extended beyond a simple deterministic algorithm in which the application code forces a permission request to the security manager and updates the policy based on the response to that request. For instance, the policy may be updated based on machine learning algorithms (e.g., random forest, deep learning, etc.). Additionally, the learning algorithm may ingest information from other computing devices to build a policy based on other machine learning analytics from endpoint and network solutions.

In yet another example, the policy generation agent may specify implement a partial security policy. The agent may specify specific code module packages (e.g., com.corporation.product.etc) on which the security policy will be enforced. The policy update logic will only write a policy for the specified packages. In this example, a custom security manager may be used in production that automatically grants permissions to packages developed internally, but allows the security manager to make the decision for third party packages based on the partial security policy.

In still another example, the policy generation agent may create a dynamic security policy based on either a partial or full security policy. The dynamic security policy includes security enforcement sections that are tied to a monitored event (e.g., an indication of suspicious activity) and "kick in" based on logic (e.g., standard algorithmic logic or machine learning). In this way, when the runtime needs to be dynamically hardened, the security policy enables more parts of the security policy. In a dynamic security policy, parts of the policy are only enforced based on escalation or trigger conditions (e.g., login failures, command execution, etc.) that have a duration for enforcement.

Partial security policy and/or dynamic security policy generation may be used to conserve resources, since the latency of the security manager checking each permission request may not be necessary. For instance, some code modules may be inherently trusted with all permissions because they were written by trusted internal developers. This partial security policy may speed up the development by automatically trusting code modules written internally by trusted sources, while providing security for packages written by unknown third party developers. Additionally, different environments might require different permissions. For instance, the same application may be deployed inside a firewall or in a De-Militarized Zone (DMZ), and enforcing some permissions may not be necessary.

In still a further example, a production application may dynamically load a registered policy from a repository at runtime. Since the policies are specific to which permissions are called by a specific application build, the policy is ideally generated at the build time of the application. The application name, version, and build number may be sent to a remote repository with the generated policy as part of the application build process. At runtime, the application would send information (e.g., the application name, version, and build number) to the repository and receive the appropriate policy from the repository.

Figure 2:
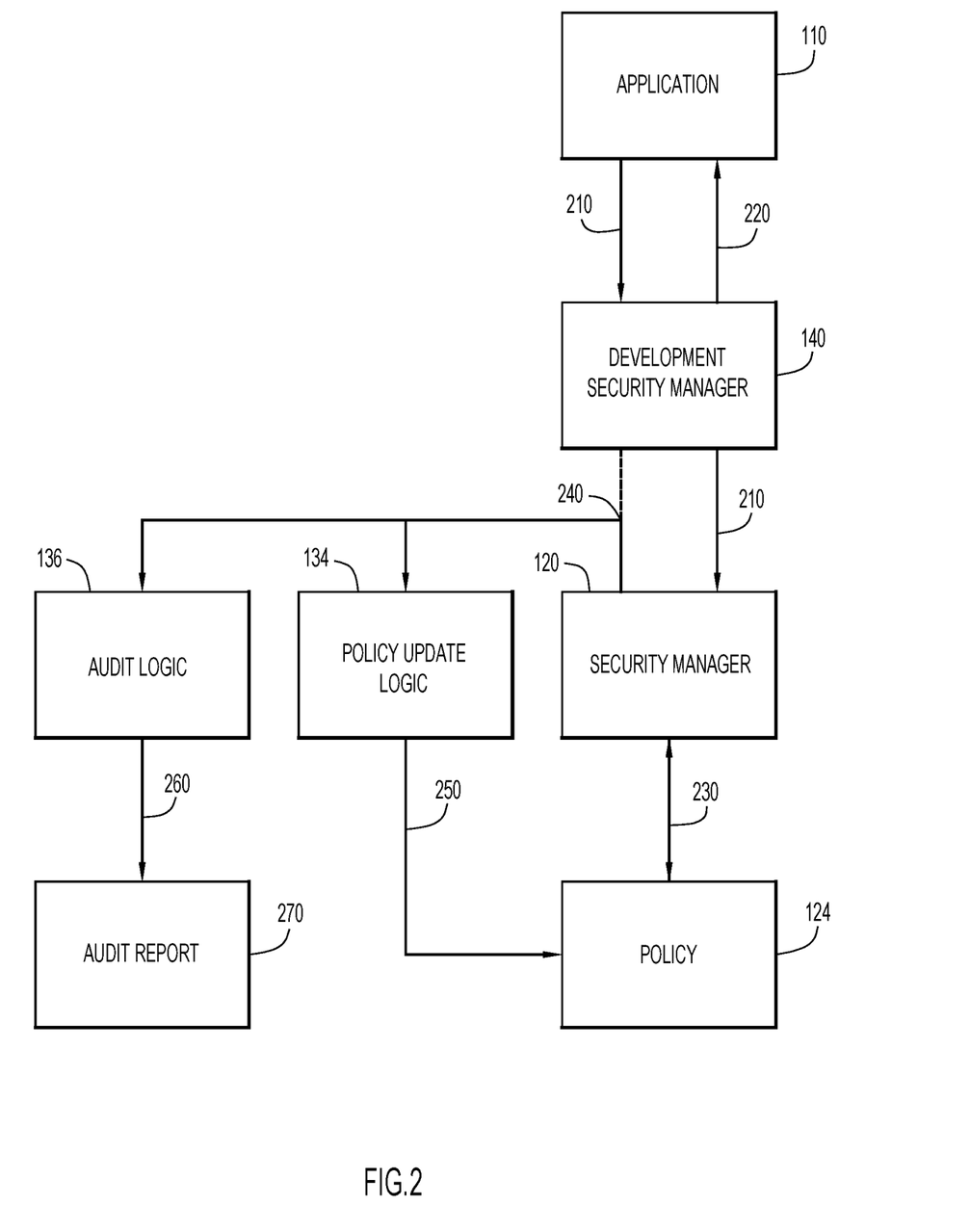
FIG. 2 is a block diagram of communications between elements of the development environment in tracking permission requests and updating a security policy, according to an example embodiment.

Referring now to FIG. 2, a block diagram is shown that illustrates communications between components of the development environment during the generation of a policy file and an audit of the permission requests. The application 110 runs a code module that requests a particular permission (e.g., a socket permission, a runtime permission, a property permission, etc.), the policy generation agent sends the request 210 to the development security manager 140. The development security manager 140 responds with an approval 220 of the permission, and forwards the request 210 to the security manager 120. At 230, the security manager 120 checks the policy 124 to determine if the permission request should be granted. In one example, the policy 124 may be an inclusive policy by default, and allow any requests that are not explicitly denied in the policy 124. Alternatively, the policy 124 may be an exclusive policy by default, and deny any requests that are not explicitly granted in the policy 124.

The result 240 of the permission request may be forwarded to the policy update logic 134 and/or the audit logic 136. If the security manager 120 denies a permission request 210, and throws a security exception as the result 240, the development security manager 140 intercepts the exception and allows the application 110 to continue running.

The policy update logic 134 parses any permission denials (e.g., due to the absence of any associated policy for that permission) and sends a policy update 250 to the policy file 124 that updates the permissions for the application 110 so that the application has a defined policy for that permission. The audit logic 136 parses all of the results 240 to send an audit update 260 to a running audit report 270. The audit update 260 may include which code module (e.g., which protected domain) caused the permission request, whether the request succeeded or was denied, and why the request was denied. The audit report 270 may process all of the audit updates to determine overall statistics for the application (e.g., how many permission requests were made/approved/denied, which permission requests were made by each code module, etc.).

In one example, the development environment generates the development security manager for the application by attaching the policy generation agent instead of using the -Djava.lang.SecurityManager=setting. The development security manager will intercept and note every permission request, as well as any relevant information (e.g., code module location), and call the actual security manager (i.e., the security manager specified in the application that is to be tested) to determine whether or not the request would have passed or failed based on the actual policy. If the permission request would have failed, then the security exception (e.g., java.security.AccessControlException) is caught, and not passed to the application. Additionally, the protection domain(s) that caused the failed permission request is/are identified. Further, the exception is parsed for updating the policy, and added to a "failure bucket" of the protection domain(s).

At some point after the application is thoroughly exercised (i.e., most or all of the permission requests in the application have been found and handled), an updated security policy may be created from the parsed exceptions. The updated security policy may be loaded into the runtime by simply copying the updated policy file over the old policy file and restarting the application. Alternatively, the old policy file may be directly updated based on the parsed exceptions.

In another example, the policy generation agent may include multiple operations. The operations may include creating a permissions/audit report, creating or appending to a policy file being built, showing the current policy content being built, showing a log of current permission failures, and shutting down the application.

In a further example, the policy generation agent may determine performance metrics and add the performance metric to the audit report. In other words, the agent may calculate the latency per permission request, and adjust the security policy based on the performance of the application. For instance, the agent may generate a partial policy that always allows permission requests if checking the policy will have a large effect on the performance of the application. This may lead to a whitelist/blacklist of permission requests based on the performance metric calculated by the agent.

Figure 3:
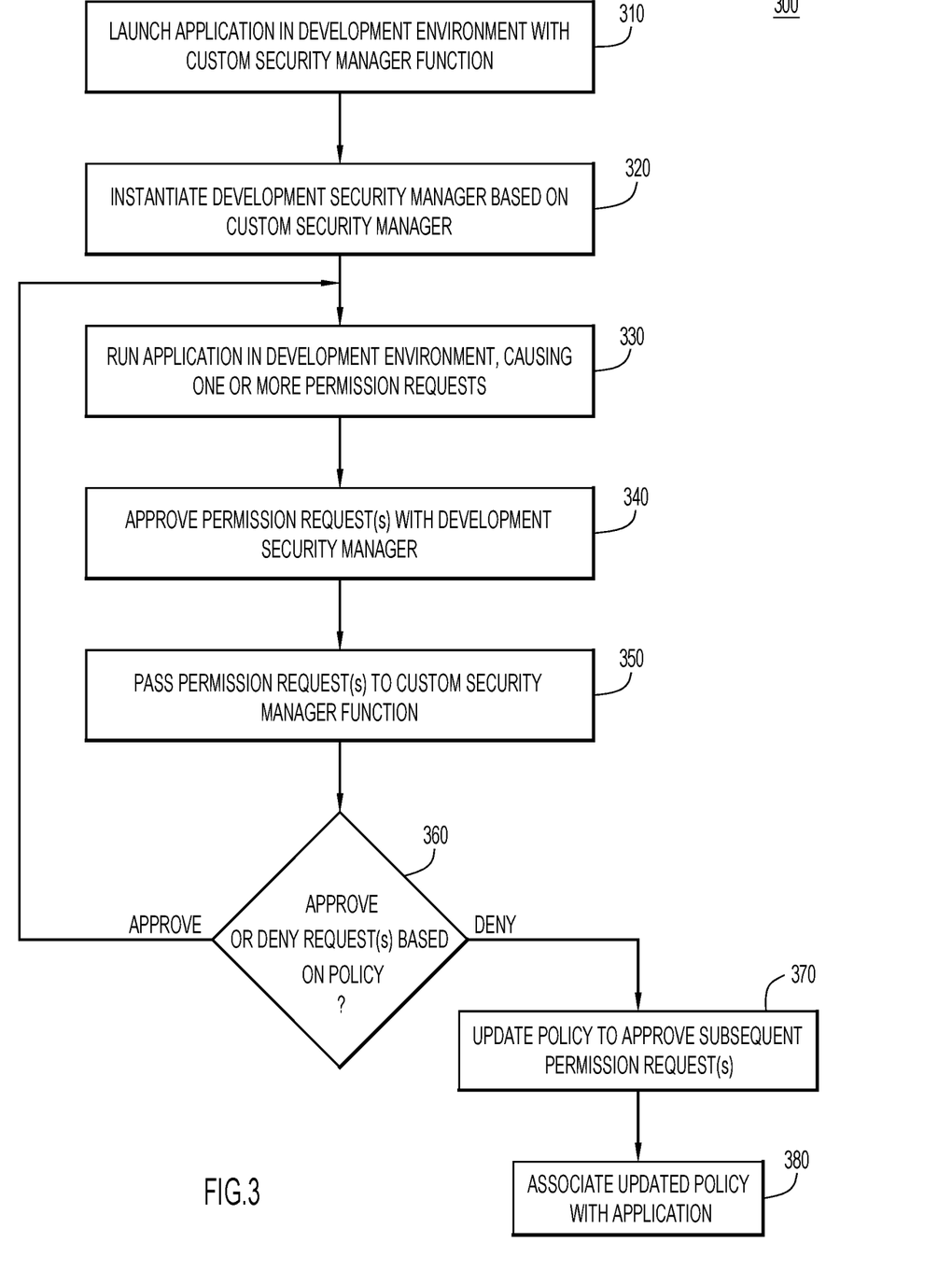
FIG. 3 is a flowchart illustrating the automatic generation of a security policy from a custom security manager, according to an example embodiment.

Referring now to FIG. 3, a flowchart illustrates an example process 300 for a policy generation agent to automatically generate and associate policy with an application. At 310, the agent launches the application in a development environment on a computing device. The application defines a custom security manager function. At 320, the agent instantiates a development security manager function based on the custom security manager function. The agent runs the application in the development environment at 330. Running the application in the development environment causes the application to request one or more permissions from the development security manager function. At 340, the development security manager function approves the one or more permissions, which maintains the flow running in the application. At 350, the development security manger function passes the request for the permissions to the custom security manger function.

At 360, the custom security manager function determines whether to approve or deny the permission request based on a permissions policy. If the custom security manager function approves the request, then the process 300 continues with running the application until another permission request is made. If the custom security manager function denies the permission request, then the agent updates the permissions policy to approve subsequent requests for the one or more permissions. In one example, the custom security manager function may deny the permission request because the permissions policy does not have an explicit entry for the requests permissions, and updating the permissions policy comprises adding the permission grant to the permissions policy. At 380, the agent associates the updated permissions policy with the application. In one example, the agent waits until no more updates to the permissions policy are being made (i.e., all of the permission requests have already been made and handled) before associating the updated policy with the application.

Figure 4:
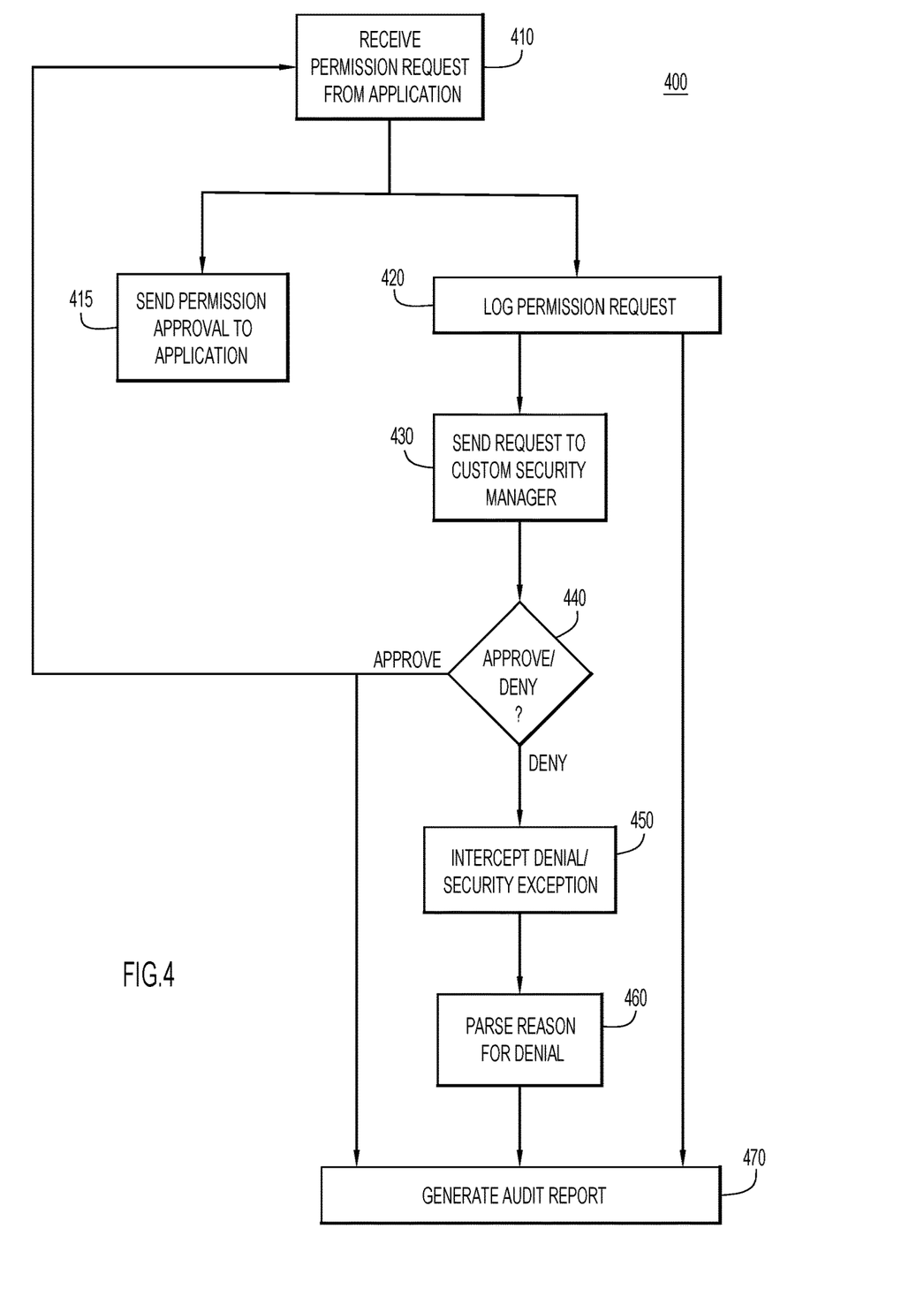
FIG. 4 is a flowchart illustrating the generation of an audit report of permission requests from an application in a development environment, according to an example embodiment.

Referring now to FIG. 4, a flowchart illustrates a process 400 by which a policy generation agent generates an audit report for permissions requested by an application. At 410, the agent receives a permission request from a running application. In one example, the agent includes a development security manager function to receive the permission requests and an application loader to run the application in a development environment. At 415, the agent uses the development security manager function to approve the permission request and allow the application to continue running in the development environment.

At 420, the agent stores a record of the permission request. In one example, the agent may store what permission was requested, which code module in the application initiated the request, or other metadata describing the permission request. At 430, the agent sends the permission request to a custom security manager function for evaluation against a security policy. The custom security manager function determines whether to approve or deny the permission request at 440. In one example, the custom security manager function checks a permissions policy file to determine whether to approve or deny the permission request. If the custom security manager function approves the permission request, then the process 400 resumes when/if the agent receives another permission request from the application.

If the custom security manager function denies the permission request, then the agent intercepts the denial and any security exception at 450. Additionally, the agent parses the permission denial at 460 to determine a reason for the denial. In one example, the permission request may be denied because of an explicit entry in a security policy that denies the application that permission. Alternatively, the permission request may be denied simply because the security policy does not have an explicit entry for the requested permission, but a default policy to deny any permission requests that are not explicitly granted.

At 470, the agent gathers data from all of the permission requests, both approved and denied, and generates an audit report. In one example, the audit report may include a count of permission requests, reasons for each request denial/approval, identifiers of code modules requesting permissions, or other metadata associated with the permission requests, as well as combinations of the metadata. For instance, the audit report may list which code modules were denied which permission requests, but only quantify the total number of permission approvals without tracking which code modules requested the permissions that were approved.

Figure 5:
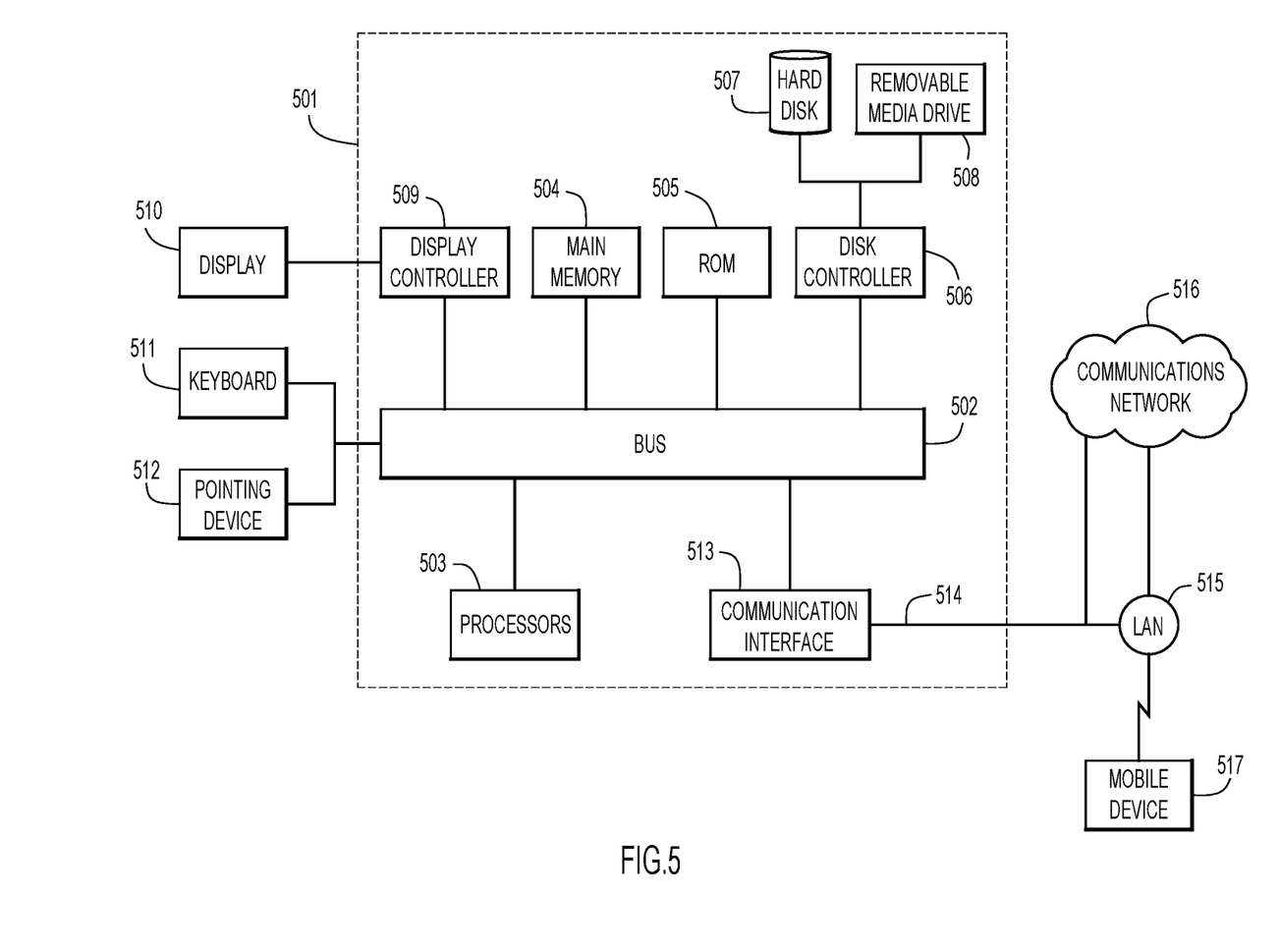
FIG. 5 is a block diagram of a device that may be configured to perform methods presented herein, according to an example embodiment.

Referring now to FIG. 5, an example of a block diagram of a computer system 501 that may be representative of a computing device in which the embodiments presented may be implemented is shown. The computer system 501 may be programmed to implement a computer based device, such as a laptop computer, desktop computer, tablet computer, smart phone, internet phone, network element, or other computing device. The computer system 501 includes a bus 502 or other communication mechanism for communicating information, and a processor 503 coupled with the bus 502 for processing the information. While the figure shows a single block 503 for a processor, it should be understood that the processors 503 may represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD) or light emitting diode (LED) display, for displaying information to a computer user. The computer system 501 includes input devices, such as a keyboard 511 and a pointing device 512, for interacting with a computer user and providing information to the processor 503. The pointing device 512, for example, may be a mouse, a trackball, track pad, touch screen, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the operations presented herein in response to the processor 503 executing one or more sequences of one or more instructions contained in a memory, such as the main memory 504. Such instructions may be read into the main memory 504 from another computer readable storage medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the operations presented herein, and for enabling the computer system 501 to interact with a human user (e.g., a software developer). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA), tablet computer, laptop computer, or cellular telephone.

In summary, the techniques presented herein provide for an agent that loads with the runtime to test a specified security manager and a specified security policy. The agent includes its own security manager that is set to intercept all permission calls to the security manager. The agent creates an audit trail for all permission calls/requests, and call the "test" specified security manager for each permission request. If the "test" specified security manager throws an exception, the agent records the exception and code location. At periodic intervals (e.g., every few minutes), the agent converts all of the exceptions into policy rules and either creates or appends permissions to a new policy file. The agent refreshes the current runtime with the new policy file until the runtime no longer requests any permissions that would throw an exception.

One benefit provided by the agent over the typical techniques of configuring a policy is that the agent audits and reports permission requests for third party code modules used by the application. The agent also tests proposed security managers and policies in a staged test environment before being used in production (e.g., DevOps/SecOps), and builds a security policy in an automated manner.

In one form, a method is provided for a policy generation agent to automatically generate a security policy for an application and a specified custom security manager function. The method includes launching on a computing device an application in a development environment. The application defines a custom security manager function. The method also includes instantiating a development security manager function based on the custom security manager function. The agent runs the application in the development environment, which causes the application to request one or more permissions from the development security manager function. The method further comprises passing the request for the permissions to the custom security manager function and approving the one or more permissions by the development security manager function. The custom security manger function determines whether to approve or deny the request based on a permissions policy. Responsive to a determination to deny the request, the method comprises updating the permissions policy to approve subsequent requests for the one or more permissions. The method also includes associating the updated permissions policy with the application.

In another form, an apparatus is provided comprising a memory and a processor coupled to the memory. The processor is configured to execute instructions stored on the memory to launch an application in a development environment. The application defines a custom security manager function. The processor is also configured to instantiate a development security manager function based on the custom security manager function. The agent runs the application in the development environment, which causes the application to request one or more permissions from the development security manager function. The processor is further configured to pass the request for the permissions to the custom security manager function and approve the one or more permissions by the development security manager function. The custom security manger function determines whether to approve or deny the request based on a permissions policy. Responsive to a determination to deny the request, the processor is configured to update the permissions policy to approve subsequent requests for the one or more permissions. The processor is also configured to associate the updated permissions policy with the application.

In yet another form, one or more non-transitory computer readable storage media is encoded with software comprising computer executable instructions and, when the software is executed by a processor, cause the processor to launch an application in a development environment. The application defines a custom security manager function. The software is also operable to cause the processor to instantiate a development security manager function based on the custom security manager function. The agent runs the application in the development environment, which causes the application to request one or more permissions from the development security manager function. The software is further operable to cause the processor to pass the request for the permissions to the custom security manager function and approve the one or more permissions by the development security manager function. The custom security manger function determines whether to approve or deny the request based on a permissions policy. Responsive to a determination to deny the request, the software is operable to cause the processor to update the permissions policy to approve subsequent requests for the one or more permissions. The software is also operable to cause the processor to associate the updated permissions policy with the application.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   running an application in a development environment, wherein running the application causes the application to produce a request for one or more permissions from a security manager function;
   passing the request for the permissions to the security manager function;
   determining, with the security manager function, whether to approve or deny the request based on a permissions policy;
   responsive to a determination by the security manager function to deny the request, generating an updated permissions policy by updating the permissions policy to approve subsequent requests for the one or more permissions;
   associating the updated permissions policy with the application;
   suppressing any exceptions generated by the security manager function in denying the request for the one or more permissions; and
   approving the one or more permissions in the development environment.

2. The method of claim 1, further comprising iteratively updating the permissions policy based on additional requests for additional permissions.

3. The method of claim 2, further comprising:
   determining whether running the application no longer generates the additional requests for the additional permissions;
   halting the application in the development environment; and
   associating a final permissions policy with the application.

4. The method of claim 1, wherein the security manager function is a custom security manage defined by the application.

5. The method of claim 1, further comprising:
   storing a record of each permission requested while running the application in the development environment; and generating an audit report on permissions requested by one or more third party software function modules called by running the application.

6. The method of claim 1, wherein running the application comprises using a script to access specific portions of source code in the application.

7. The method of claim 6, wherein the source code of the application includes third party modules.

8. An apparatus comprising:
a memory; and
a processor coupled to the memory, the processor configured execute instructions stored in the memory to:
  run an application in a development environment, wherein running the application causes the application to produce a request for one or more permissions from a security manager function;
  pass the request for the permissions to the security manager function;
  cause the security manager function to determine whether to approve or deny the request based on a permissions policy;
  responsive to a determination by the security manager function to deny the request, generate an updated permissions policy by updating the permissions policy to approve subsequent requests for the one or more permissions;
  associate the updated permissions policy with the application
  suppress any exceptions generated by the security manager function in denying the request for the one or more permissions; and
  cause the security manager function to approve the one or more permissions in the development environment.

9. The apparatus of claim 8, wherein the processor is further configured to iteratively update the permissions policy based on additional requests for additional permissions.

10. The apparatus of claim 9, wherein the processor is further configured to:
  determine whether running the application no longer generates the additional requests for the additional permissions;
  halt the application in the development environment; and
  associate a final permissions policy with the application.

11. The apparatus of claim 8, wherein the processor is configured to operate the security manager function as a custom security manage defined by the application.

12. The apparatus of claim 8, wherein the processor is further configured to:
  store in the memory, a record of each permission requested while running the application in the development environment; and
  generate an audit report on permissions requested by one or more third party software function modules called by running the application.

13. The apparatus of claim 8, wherein the processor is configured to run the application by using a script to access specific portions of source code in the application.

14. The apparatus of claim 13, wherein the source code of the application includes third party modules.

15. One or more non-transitory computer readable storage media encoded with software comprising computer executable instructions and, when the software is executed by a processor, cause the processor to:
  run an application in a development environment, wherein running the application causes the application to produce a request for one or more permissions from a security manager function;
  pass the request for the permissions to the security manager function;
  cause the security manager function to determine whether to approve or deny the request based on a permissions policy;
  responsive to a determination by the security manager function to deny the request, generate an updated permissions policy by updating the permissions policy to approve subsequent requests for the one or more permissions;
  associate the updated permissions policy with the application;
  suppress any exceptions generated by the security manager function in denying the request for the one or more permissions; and
  cause the security manager function to approve the one or more permissions in the development environment.

16. The non-transitory computer readable storage media of claim 15, further comprising instructions operable to cause the processor to iteratively update the permissions policy based on additional requests for additional permissions.

17. The non-transitory computer readable storage media of claim 16, further comprising instructions operable to cause the processor to:
  determine whether running the application no longer generates the additional requests for the additional permissions;
  halt the application in the development environment; and
  associate a final permissions policy with the application.

18. The non-transitory computer readable storage media of claim 15, further comprising instructions operable to cause the processor to operate the security manager function as a custom security manage defined by the application.

19. The non-transitory computer readable storage media of claim 15, further comprising instructions operable to cause the processor to:
  store a record of each permission requested while running the application in the development environment; and
  generate an audit report on permissions requested by one or more third party software function modules called by running the application.

20. The non-transitory computer readable storage media of claim 15, further comprising instructions operable to cause the processor to run the application by using a script to access specific portions of source code in the application, wherein the source code of the application includes third party modules.

* * * * *